Figure 1:
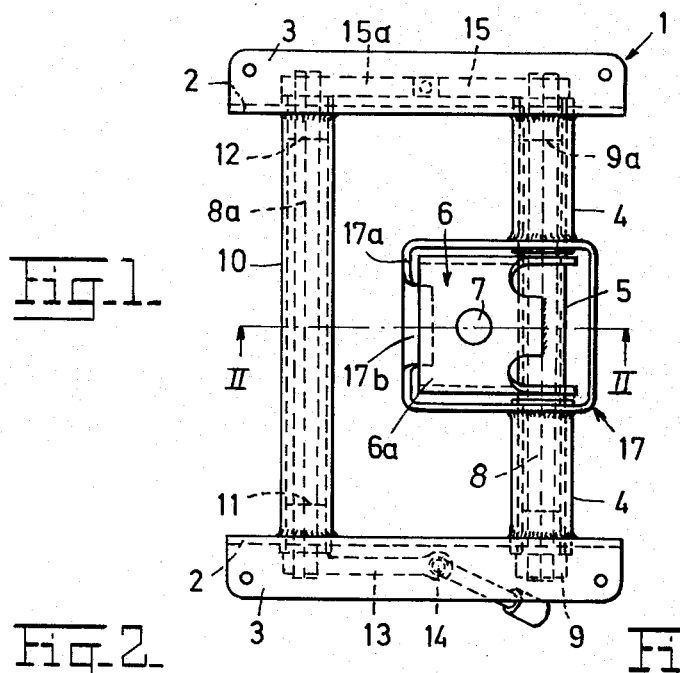

United States Patent [19]
Lie

[11] 3,868,144
[45] Feb. 25, 1975

[54] SPRING MECHANISM FOR A TILTABLE MEMBER OF A TILTING CHAIR

[76] Inventor: Finn Lie, 2391 Moelv, Norway

[22] Filed: Feb. 12, 1973

[21] Appl. No.: 331,704

[30] Foreign Application Priority Data
May 31, 1972 Norway.......................1926/72

[52] U.S. Cl................................ 297/304, 248/373
[51] Int. Cl............................................ A47c 7/00
[58] Field of Search ........... 297/300, 301, 302, 303, 297/304, 307, 308, 309, 310, 333; 248/373

[56] References Cited
UNITED STATES PATENTS

| | | | |
|---|---|---|---|
| 2,991,125 | 7/1961 | Lie...................................... | 297/304 |
| 3,185,429 | 5/1965 | Meinhardt ........................... | 248/373 |
| 3,552,706 | 1/1971 | Shingler............................... | 248/373 |
| 3,659,819 | 2/1972 | Wolters................................ | 297/304 |

FOREIGN PATENTS OR APPLICATIONS

| | | | |
|---|---|---|---|
| 612,475 | 11/1948 | Great Britain...................... | 248/373 |

Primary Examiner—Paul R. Gilliam
Assistant Examiner—Alex Grosz
Attorney, Agent, or Firm—Waters, Roditi, Schwartz & Nissen

[57] ABSTRACT

A spring mechanism for a tiltable member of a tilting chair such as a seat or a back rest comprising an upright pivot, a support member mounted on the pivot, a frame, the tiltable member being rotatably mounted with respect to the support member about a transverse, horizontal tilting axis. First and second identical torsion bars extend parallel transversely of the frame with the first torsion bar extending longitudinally of the tilting axis and the second torsion bar spaced rearwardly with respect to the first torsion bar. At one side of the frame the ends of the first and second torsion bars are non-rotatably connected with respect to the support member and the tiltable member, respectively, and at the other side of the frame, the opposite ends of the first and second torsion bar are operatively interconnected so that, as the tiltable member is tilted, both torsion bars will twist simultaneously and exert a combined resilient restraining force in opposition to the tilting movement of the tiltable member.

7 Claims, 8 Drawing Figures

SPRING MECHANISM FOR A TILTABLE MEMBER OF A TILTING CHAIR

This invention relates to a spring mechanism for a tiltable member of a tilting chair, such as a tiltable seat or back rest, and for causing the build up of a resilient restraining force in opposition to the tilting movement thereof.

It is previously known to support a seat or back rest of a chair tiltably against the action of a spring mechanism in the form of a torsion bar extending transversely of the seat and having one of its ends non-rotatably secured relatively to the member to be tilted and the other end non-rotatably secured to a support member, such as an upright pivot of a base, whereby tilting of said member about the longitudinal axis of the torsion bar is restrained by twisting of said bar.

In order to obtain a satisfactory angle of the characteristic curve of the torsion bar in relation to the cross-section thereof, the bar must have a length corresponding substantially to the whole width of a seat frame, i.e., about 16 ⅜ inches (40 centimeters).

However, due to presently developed varying furniture designs, chair seats are, for instance, of dish or bowl shape and the like, and the conventional seat frame is absent and consequently a spring device of the above mentioned type and width is not usable without projecting laterally in such manner that it becomes visible and thereby disfigures the intended appearance of different new types of chairs.

This drawback is not removed by using a shortened torsion bar which, while retaining its cross-section, does not provide the necessary resilient resistance. If the cross-section of the bar is increased, this is unsatisfactory, as the angle of the characteristic curve then becomes so steep that the intended resilient effect is not obtained.

Accordingly, a principal object of this invention is to provide a simple and durable spring mechanism having a compact construction and small width so that it is easy to apply to tiltable chairs of different forms in a substantially concealed position, while at the same time providing the desired resilient effect to restraing tilting movement of a seat or a back rest.

Another object of the invention is to provide a spring device for a tiltable chair member, comprising a frame, first and second identical torsion bars of a relatively short length, extending in speced relation transversely of said frame, the ends of said torsion bars at one side of the frame being non-rotatably connected to a member supporting the frame and the member to be tilted, respectively, and means at the opposite side of the frame interconnecting operatively the opposite ends of sais torsion bars to twist said bars under reciprocal influence, acting as a single torsion bar, during tilting of said tilting member.

In this manner it is made possible for a conventional single torsion bar, having, for instance, the above length of 16 ⅜ inches (40 centimeters) to be replaced by two torsion bars each having an effective length of about 8 3/16 inches (20 centimeters).

Figure 2:
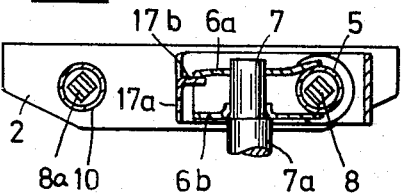
Figure 3:
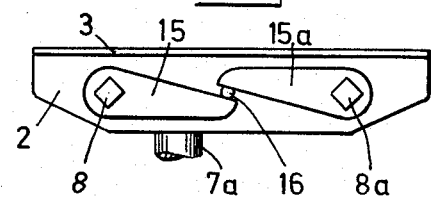
Figure 4:
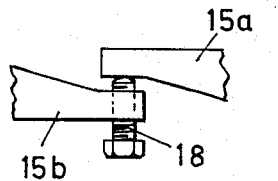
Figure 5:
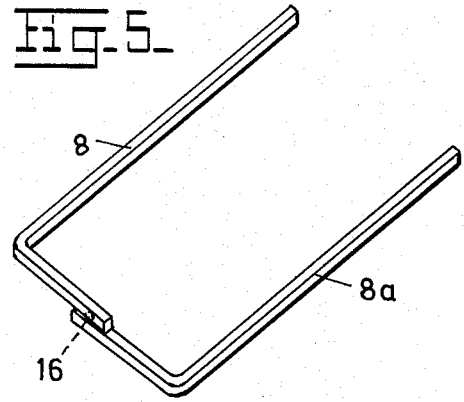
Figure 6:
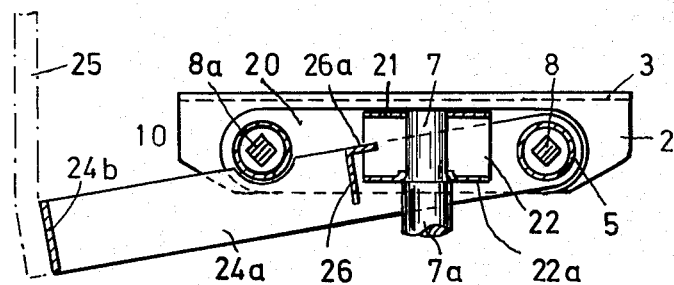
Figure 7:
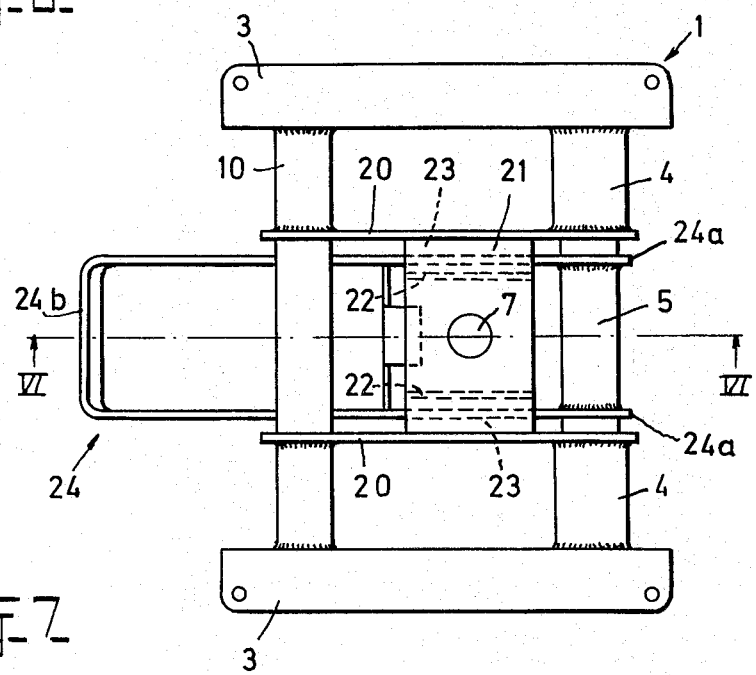
Figure 8:
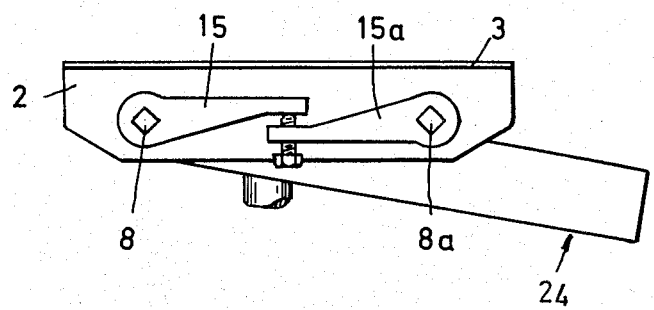

Embodiments of the invention are illustrated, by way of example, in the accompanying drawings in which:

FIG. 1 is a top plan view of a spring mechanism to be secured on the underside of seat members of different types, FIG. 2 is a cross-section taken along line II—II in FIG. 1, FIG. 3 is a side view of the frame seen from the upper side in FIG. 1, FIG. 4 is a detail view of a modified arrangement for the overlapping lever ends of the spring mechanism, FIG. 5 is a perspective view of an alternative embodiment of the torsion bars, FIG. 6 is a cross-section taken along line VI—VI in FIG. 7 illustrating the mechanism connected with a tiltable back-rest, FIG. 7 is a top plan view of the mechanism in FIG. 6, and FIG. 8 is a side view seen from the upper side in FIG. 7.

In the drawings FIGS. 1, 2, and 3 illustrate the mechanism used in connection with a tiltable chair seat, and numeral 1 denotes a frame of the mechanism comprising two spaced, parallel side pieces each having a vertical portion 2 and a horizontal portion 3 projecting outwardly from said portion 2 and serving as a securing means for the frame on the underside of a seat member (not shown).

At the forward end of each side piece, in an opening in the vertical portion 2 thereof, there is secured such as by welding, a tube shaped bearing sleeve 4, which sleeves are aligned and directed towards one another and serve to receive rotatably the end portions of a transversely extending first tube-shaped member 5 to which, by welding, is secured a rearwardly directed hollow support member 6 having upper and lower horizontal walls 6a and 6b, respectively, provided with aligned bores for receiving an upper reduced end portion 7 of a pivot 7a on a support base (not shown).

Within the tube-shaped member 5, and extending longitudinally thereof is a first torsion bar 8, preferably a steel bar of square cross-section, one end of which is passed non-rotatably through a plug 9 secured, as by welding, in one end of said first tube-shaped member 5. At the other end of said tube member 5 the torsion bar 8 is passed non-rotatably through a plug 9a which is rotatably supported in said member 5.

Transversely of the side members and spaced rearwardly from said first tube-shaped member 5 is secured a second tube-shaped member 10, such as by welding, in openings in the vertical portions 2 thereof, and within which and extending longitudinally thereof is a second torsion bar 8a, which in all respects is the same as the first torsion bar 8, and the ends of which are passed non-rotatably through plugs 11 and 12, respectively, rotatably supported in said second tube member 10.

The end of the second torsion bar 8a projecting from the plug 11 is connected non-rotatably to the seat mounting member by means of a lever 13 having one end fixed to the bar 8a and an adjusting screw 14 threaded through its other, free end to engage the underside of the portion 3 and said screw serves also as pre-tensioning means for the torsion rods.

The ends of the torsion rods 8 and 8a projecting from the plugs 9a and 12, respectively, are each provided with a fixed lever 15 and 15a, respectively, (FIG. 3) which levers, having equal length, are directed towards each other so that the free ends thereof extend beyond one another with the lever 15a on the bar 8a engaging the upper side of the lever 15 on the rod 8. One of the end of the levers may be provided with a sphere-like contact means 16 providing a point contact between said levers midway between the torsion bars 8 and 8a.

In order to prevent forward tilting of the frame 1 from the normal position shown in the drawing, a rearwardly directed bail or loop 17, encircling the hollow support member 6, has its legs or said portions secured, such as by welding, to respective adjacent inner ends of the bearing sleeves 4, and its rear cross-piece 17a is formed with a forward directed angle portion 17b projecting into the rear open end of the hollow support member 6 engaging the upper wall 6a thereof serving as a stop to retain the frame against rotation in the clockwise direction by the effect of the pre-tensioning of the torsion bars, as viewed in FIG. 2.

In lieu of using the pre-tensioning means 13, 14 these may be omitted and the plug 11 secured in the tube member 10, such as by welding, while said means, as shown in FIG. 4, may be replaced by an adjusting screw 18 threaded through the end of one of the levers 15a or 15b on the torsion bars, such as the lever 15b, into contact with the end of the other lever 15a, whereby the desired pre-tensioning of the torsion bars may be adjusted by forcing the lever ends more or less apart when the chair is to be put into use.

Further, instead of using levers secured separately on the ends of the respective torsion bars, said levers may be integral with the respective bar forming a bent portion thereof as shown in FIG. 5.

When, with the arrangement of parts as shown in FIGS. 1 to 3, the frame together with a seat supported thereon, is tilted counter clockwise about the longitudinal axis of the first torsion bar 8, as viewed in FIG. 2, said bar will twist and exert by the lever 15 thereon a resilient restraining force on the lever 15a of the torsion bar 8a which thereby also will twist and exert a similar resilient restraining force which is added to the first mentioned force so that the joint action on the frame corresponds to the action of a single torsison bar having twice the length of one of the bars above described.

In FIGS. 6 to 8, the spring mechanism is shown connected to a tiltable back rest, and in which similar parts or members have same references as in FIGS. 1 to 5.

Between the vertical parts 2 of the side pieces of the frame 1 the rear tube 10 is secured, receiving the second torsion bar 8a with the plug 11 non-rotatably secured in said tube. The tube-shaped member 5, receiving the first torsion bar 8, is rotatably supported in the bearing sleeves 4, and the plug 9 is secured in the end of member 5 as above described.

Between the inner end of each of the bearing sleeves 4 and the rear tube 10 is secured, such as by welding, a plate strip 20 and said strips are interconnected by means of a horizontal plateshaped cross-piece 21. On the underside of the cross-piece 21 is secured the legs 22 of a U-shaped member, formed of a bent metal strip, and having a width somewhat smaller than the distance between the strips 20 leaving between said strips and each of the legs 22 an intermediate space 23. The cross-piece 22a of the U-shaped member and the upper cross-piece 21 have formed therein aligned bores for receiving the upper reduced end 7 of the supporting pivot 7a.

A U-shaped member 24, formed of a bent metal strip has its legs at the ends 24a thereof secured to the rotatable tube member 5 and these extend, through said intermediate spaces 23, inclined rearwardly and downwardly below the tube 10 with its cross-piece 24b in position to be connected to a support member 25 for a back rest, as indicated in dot and dash lines in FIG. 6.

Also in this embodiment, the ends of the torsion bars 8, 8a projecting from the rotatably supported plugs 9a and 12, respectively, are provided with respective cooperating levers 15, 15a, so that as the U-shaped member 24, by tilting of the back rest, swings downwardly the first torsion bar 8 will twist within the rotatable tube member 5 and exert, by the lever 15 thereon, a resilient restraining force on the lever 15a on the torsion bar 8a which thereby also will twist and exert a similar resilient restraining force which is added to the first mentioned force so that the joint action on the U-shaped member 24 corresponds to the action of a single torsion bar having twice the length of one of the bars 8 and 8a as previously explained.

In order to limit the downward movement of the U-shaped member 24, a cross-piece 26 is secured between the legs thereof and is provided with an angle portion 26a abutting against the crosspiece 22a of the support member. The member 24 is maintained in its normal position, against the action of the pretensioning of the torsion bars 8, 8a, by being impacted against the lower side of the tube 10, or a projection may be provided on the cross-piece 26 for cooperation with the lower side of the cross-piece 22a.

I claim:

1. A spring mechanism for a tiltable member of a tilting chair having a base, said spring mechanism comprising a support member mountable on the base, a frame including side pieces, means connecting the frame to the support member for pivotal movement about a horizontal tranverse tilting axis, the latter said means comprising first and second torsion bars extending transversely of the side pieces of the frame, said first torsion bar extending in horizontal alignment with said transverse tilting axis, said second torsion bar being spaced rearwardly thereof, a first tube-shaped member secured to the support member, tube-shaped bearing sleeves secured to said side pieces of the frame and rotatably receiving said first tube-shaped member, a second tube-shaped member spaced rearwardly from said first tube-shaped member and secured to said side pieces of the frame, said first torsion bar extending longitudinally within said first tube-shaped member, said second torsion bar extending longitudinally and freely rotatably within the second tube-shaped member, means at one of the side pieces of the frame connecting one end of said first torsion bar non-rotatably to the first tube-shaped member, further means at said one side piece of the frame connecting one end of said second torsion bar non-rotatably to said one side piece, means at the other side piece of the frame operatively interconnecting the other of the ends of the first and second torsion bars so that as the frame is tilted both torsion bars will twist simultaneously and exert a combined resilient restraining force in opposition to the tilting movement of said frame, said means which operatively interconnects said other ends of the torsion bars comprising levers respectively fixed to said other ends of the torsion bars and extending towards one another, said levers having free ends freely overlapping one another, and contact means carried by one of said levers at said free end thereof and freely bearing against the free end of the other of said levers to provide a substantially point contact between said levers when they are moved relative to one another in one direction while permitting unhindered relative movement in the other direction, and stop means operatively cooperating between said frame and said support member for limiting the tilting movement of said frame relative to said support member in a direction opposite the normal direction of tilting of said frame.

2. A mechanisim as claimed in claim 1 wherein the support member is secured to the first tube-shaped member intermediate the opposite ends of the latter.

3. A mechanism as claimed in claim 1 comprising means connecting said contact means to said free end of said one lever for adjustment of the position of the contact means towards the free end of the other lever.

4. A mechanism as claimed in claim 1 wherein said contact means comprises an adjusting screw threaded through the end of said one lever for contacting the end of said other lever, whereby adjustable pre-tensioning of the torsion bars may be effected by forcing the lever ends apart.

5. A mechanism as claimed in claim 1 wherein said levers are integral with their respective torsion bars and form a bent portion thereof.

6. A spring mechanism for a tiltable member of a chair having a base, said spring mechanism comprising a support member mountable on the base, a frame including side pieces, connecting means rigidly connecting the frame to the support member, a pivotal member adapted for connection with said tiltable member, means connecting the pivotal member to the frame for pivotal movement about a horizontal transverse tilting axis, the latter said means comprising first and second torsion bars extending transversely of the side pieces of the frame, said first torsion bar extending in horizontal alignment with said transverse tilting axis, said second torsion bar being spaced rearwardly thereof, a first tube-shaped member secured to the pivotal member, said connecting means including tube-shaped bearing sleeves secured to said side pieces of the frame and rotatably receiving said first-tube-shaped member, a second tube-shaped member spaced rearwardly from said first tube-shaped member and secured to said side pieces of the frame, said first torsion bar extending longitudinally within said first tube-shaped member, said second torsion bar extending longitudinally and freely rotatably within the second tube-shaped member, means at one of the side pieces of the frame connecting one end of said first torsion bar non-rotatably to the first tube-shaped member, further means at said one side piece of the frame connecting one end of said second torsion bar non-rotatably to said one side piece, means at the other side piece of the frame operatively interconnecting the other of the ends of the first and second torsion bars so that as the pivotal member is tilted both torsion bars will twist simultaneously and exert a combined resilient restraining force in opposition to the tilting movement of said pivotal member, said means which operatively interconnects said other ends of the torsion bars comprising levers respectively fixed to said other ends of the torsion bars and extending towards one another, said levers having free ends freely overlapping one another, and contact means carried by one of said levers at said free end thereof and freely bearing against the free end of the other of said levers to provide a substantially point contact between said levers when they are moved relative to one another in one direction while permitting unhindered relative movement in the other direction, and stop means operatively cooperating between said pivotal member and said support member for limiting the tilting movement of said pivotal member relative to said support member.

7. A mechanism as claimed in claim 1 comprising means connecting said contact means to said free end of said one lever for adjustment of the position of the contact means towards the free end of the other lever.

* * * * *